US010524462B2

(12) United States Patent
Sapienza

(10) Patent No.: US 10,524,462 B2
(45) Date of Patent: Jan. 7, 2020

(54) BUG TRAP WITH FLEXIBLE TWO-PIECE HANDLE

(71) Applicant: Michael Sapienza, North Ridgeville, OH (US)

(72) Inventor: Michael Sapienza, North Ridgeville, OH (US)

( * ) Notice: Subject to any disclaimer, the term of this patent is extended or adjusted under 35 U.S.C. 154(b) by 197 days.

(21) Appl. No.: 15/613,730

(22) Filed: Jun. 5, 2017

(65) Prior Publication Data

US 2017/0347639 A1    Dec. 7, 2017

Related U.S. Application Data

(60) Provisional application No. 62/346,047, filed on Jun. 6, 2016.

(51) Int. Cl.
*A01M 3/00* (2006.01)
*A01M 3/02* (2006.01)
*A01M 1/10* (2006.01)

(52) U.S. Cl.
CPC ............... *A01M 1/10* (2013.01); *A01M 3/00* (2013.01); *A01M 3/02* (2013.01)

(58) Field of Classification Search
CPC ............................... A01M 3/00; A01M 3/002
USPC .................................. 43/133, 134, 135, 136
See application file for complete search history.

(56) References Cited

U.S. PATENT DOCUMENTS

| 229,230 | A | * | 6/1880 | Anderson | ............... | A01M 3/00 |
| | | | | | | 43/134 |
| 229,317 | A | * | 6/1880 | Jones | .................... | A01M 3/027 |
| | | | | | | 43/135 |
| 382,580 | A | * | 5/1888 | Wilmot et al. | ........ | A01M 3/022 |
| | | | | | | 43/136 |
| 979,640 | A | * | 12/1910 | Boerngen | ............. | A01M 3/022 |
| | | | | | | 43/136 |
| 1,116,895 | A | * | 11/1914 | Karschner | ............. | A01M 3/022 |
| | | | | | | 43/136 |
| 1,132,141 | A | * | 3/1915 | Wilson | ................... | A01M 3/022 |
| | | | | | | 43/136 |

(Continued)

FOREIGN PATENT DOCUMENTS

| CH | 701265 A2 | * | 12/2010 | .............. | A01M 3/02 |
| DE | 4322460 A1 | * | 2/1994 | .............. | A01M 3/00 |

(Continued)

OTHER PUBLICATIONS

Google English translation of DE 4322460 (Year: 1994).*
Google English translation of DE 202017100836 (Year: 2017).*
Translation of DE 202017100836 (Year: 2017).*

*Primary Examiner* — Darren W Ark
(74) *Attorney, Agent, or Firm* — Rankin, Hill & Clark LLP

(57) ABSTRACT

An apparatus for catching bugs is provided which includes a catch box having an interior region and an elongated handle attached to the catch box. The elongated handle includes a flexible tube member and a flexible rod member disposed within the flexible tube member. The apparatus includes a trap adapted to move back and forth within the interior region of the catch box. The flexible tube member is attached to the catch box and the flexible rod member is attached to the trap. The flexible rod member is adapted to provide back and forth movement of the trap within the interior region of the catch box to thereby define a closed chamber in the interior of the box for trapping bugs.

8 Claims, 3 Drawing Sheets

(56) References Cited

U.S. PATENT DOCUMENTS

| | | | | |
|---|---|---|---|---|
| 1,154,310 A * | 9/1915 | Hemenway | A01M 3/022 | 43/136 |
| 1,174,733 A * | 3/1916 | Kelly | A01M 3/027 | 43/135 |
| 1,488,145 A * | 3/1924 | Bellows | A01M 3/02 | 43/136 |
| 1,750,163 A * | 3/1930 | Disney | A01M 3/00 | 43/134 |
| 3,449,856 A * | 6/1969 | Weaver | A01M 3/022 | 43/136 |
| 3,778,097 A * | 12/1973 | Dorzan | A01K 23/00 | 294/1.4 |
| 4,017,015 A * | 4/1977 | Jefferson | B65D 5/38 | 294/1.3 |
| 4,126,959 A * | 11/1978 | Graham | A01M 3/022 | 43/136 |
| 4,215,888 A * | 8/1980 | Gavin | E01H 1/1206 | 294/1.3 |
| 4,272,906 A * | 6/1981 | Liebling | A01K 77/00 | 43/11 |
| 4,286,816 A * | 9/1981 | Tobias | E01H 1/1206 | 294/1.4 |
| D262,943 S * | 2/1982 | Schadler | 294/1.3 | |
| 4,450,649 A * | 5/1984 | Dunwoody | A01M 3/027 | 124/16 |
| 4,676,022 A * | 6/1987 | Wraight | A01M 3/022 | 43/121 |
| 4,787,171 A * | 11/1988 | Dagenais | A01M 3/022 | 43/137 |
| 4,830,419 A * | 5/1989 | Watanabe | E01H 1/1206 | 15/104.8 |
| 4,850,133 A * | 7/1989 | Burzdak | A01M 3/00 | 43/136 |
| 5,207,018 A * | 5/1993 | Reaver | A01M 3/02 | 43/134 |
| 5,271,178 A * | 12/1993 | Eckard | A01M 3/00 | 220/345.4 |
| 5,305,546 A * | 4/1994 | Edwards | A01M 3/00 | 43/134 |
| 5,522,173 A * | 6/1996 | Muhlinghaus | A01M 3/00 | 43/134 |
| 6,135,519 A * | 10/2000 | Kotlinski | E01H 1/1206 | 15/257.6 |
| 7,165,355 B2 * | 1/2007 | George | A01M 3/022 | 43/135 |
| 7,469,501 B1 * | 12/2008 | Blum | A01M 3/04 | 43/136 |
| 7,726,063 B2 * | 6/2010 | Hawkins | A01M 23/005 | 43/114 |
| 8,567,114 B1 * | 10/2013 | Drapeau | A01M 3/04 | 43/134 |
| 8,627,974 B2 * | 1/2014 | Francis | E01H 1/1206 | 119/867 |
| 2003/0131524 A1 * | 7/2003 | Brown | A01M 3/00 | 43/134 |
| 2008/0040967 A1 * | 2/2008 | Young | A01M 3/04 | 43/136 |
| 2009/0044443 A1 * | 2/2009 | Flaherty | A01M 3/00 | 43/110 |
| 2013/0097917 A1 * | 4/2013 | Shofet | A01M 3/00 | 43/107 |
| 2018/0184636 A1 * | 7/2018 | Yamamoto | A01M 1/103 | |

FOREIGN PATENT DOCUMENTS

| | | | | |
|---|---|---|---|---|
| DE | 19636247 A1 | * | 3/1998 | A01M 3/00 |
| DE | 202017100836 | * | 2/2017 | A01M 3/00 |
| DE | 202017100836 U1 | * | 2/2017 | A01M 3/00 |
| GB | 2050794 A | * | 1/1981 | A01M 3/027 |
| GB | 2237492 A | * | 5/1991 | A01M 3/00 |
| GB | 2393893 A | * | 4/2004 | A01M 3/002 |
| GB | 2465177 A | * | 5/2010 | A01M 3/00 |
| JP | 05007446 A | * | 1/1993 | |
| JP | H071775 U | * | 1/1995 | |
| JP | 7051035 B | * | 6/1995 | |
| JP | 2006149357 A | * | 6/2006 | |
| JP | 2007236267 A | * | 9/2007 | |
| JP | 3138754 U | * | 1/2008 | |
| JP | 3215565 U | | 3/2018 | |
| WO | WO-9117654 A1 | * | 11/1991 | A01M 3/00 |
| WO | WO-2017194846 A2 | * | 11/2017 | A01M 3/00 |

* cited by examiner

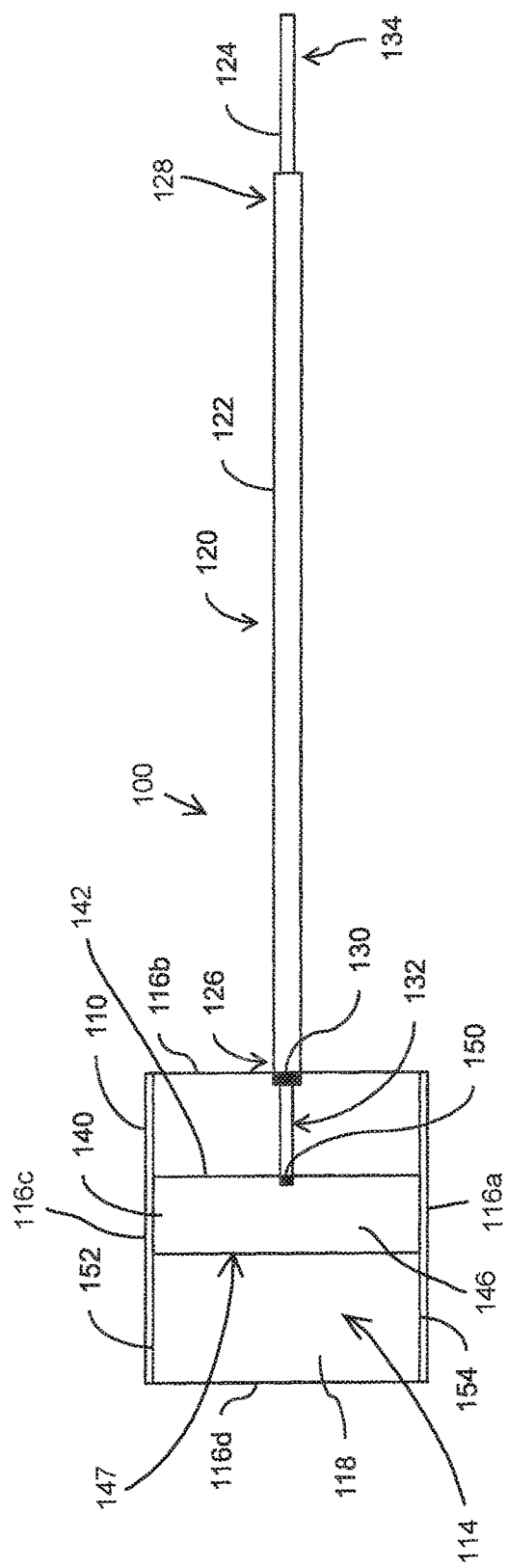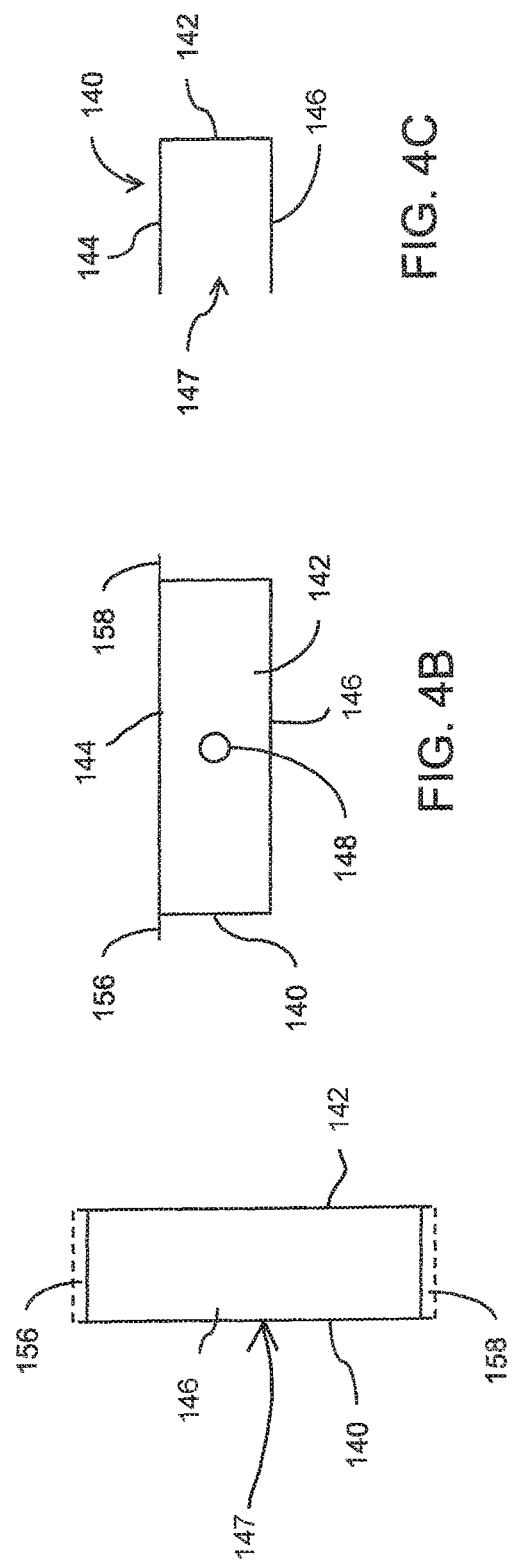

BUG TRAP WITH FLEXIBLE TWO-PIECE HANDLE

CROSS-REFERENCE TO RELATED APPLICATIONS

This application claims priority to U.S. Provisional Application 62/346,047, filed Jun. 6, 2016, which is incorporated herein by reference.

FIELD

The present subject matter relates to a bug trap for catching and subsequently releasing live bugs.

BACKGROUND

Small invertebrate creatures such as different types of insects, spiders, and numerous other types of bugs can be a nuisance in any outdoor or indoor setting. Such pests often make individuals feel uncomfortable and may even be hazardous to certain individuals. Conventional bug eliminating devices such as fly swatters are ineffective for catching and releasing bugs, due to the mechanism and force required to attack the pests, which often kill them. Further, known fly swatters and other known insect catching devices require one to kill a bug or bugs by smashing against a surface or by crushing within the device. As a result, the killing of a bug or bug using known devices leaves an unsightly and unsanitary residue on either or both of the device and the killing surface. In addition, killing the bug or bugs may not be desired. As a result, there is a need for an efficient, easy to use bug catching device for capturing and releasing a plurality of different types of bugs.

BRIEF DESCRIPTION

The embodiments disclosed herein relate to an apparatus for catching bugs which includes a flexible handle attached to a catch box and a trap.

In one aspect, a bug trap comprises a box including an upper wall and four side walls extending down from the upper wall. The upper wall and four side walls define a lower opening providing access to an interior of the box. The apparatus includes a trap arranged on the box and moveable relative to the box. The bug trap includes an elongated handle including a flexible tube attached to a side wall at the back of the box, and a flexible rod disposed within the tube, attached to the trap, and moveable relative to the tube. When the flexible rod is moved relative to the tube, the trap is moved relative to the box to thereby define a closed chamber in the interior of the box for trapping a bug.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

The following is a brief description of the drawings, which are presented for the purposes of illustrating the exemplary embodiments disclosed herein and not for the purposes of limiting the same.

FIG. 3 is a bottom view of the bug catching apparatus of FIG. 1.
FIG. 4A is a bottom view of a trap to be used in connection with a bug catching apparatus,
FIG. 4B is a rear view of the trap of FIG. 4A,
and FIG. 4C is a side view of the trap of FIG. 4A.

DETAILED DESCRIPTION

Figure 1:
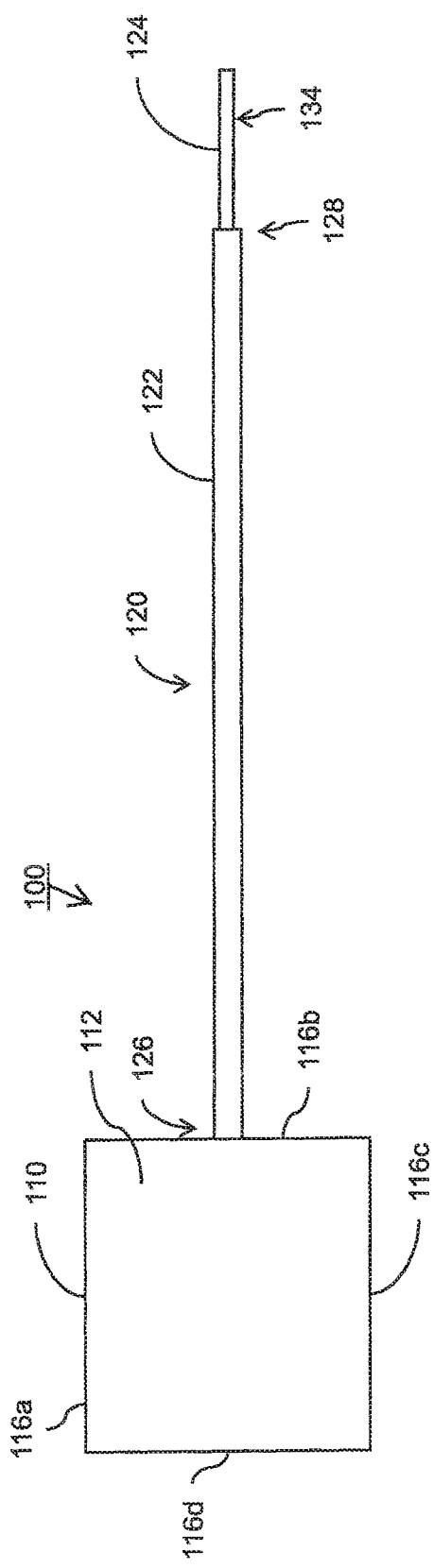
FIG. 1 is a top view of a bug catching apparatus.
Figure 2:
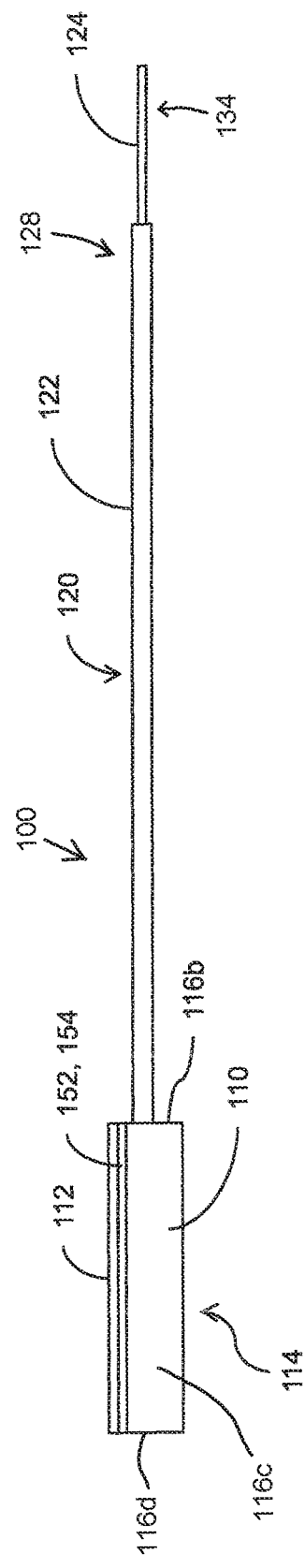
FIG. 2 is a side view of the bug catching apparatus of FIG. 1.

The embodiments disclosed herein relate to an apparatus for catching or trapping and releasing small invertebrate creatures such as different types of bugs, insects, spiders, etc., hereinafter referred to generally as bugs. The apparatus is adapted to be able to catch and release bugs without causing them harm.

The apparatus is a bug trap including a catch box, which is placed over or around the unwanted bug, wherein the bug is positioned within an opening of the catch box. The portion of the handle attached to the trap is manipulated (e.g. pushed forward towards the catch box) in order to close the trap and catch the bug inside the catch box. The trap can move forward to close off the interior of the catch box, and backward to open up the interior of the catch box. As used herein, "close" or cognate terms, refers to the trap being moved relative to the catch box in order to cover over the opening in the catch box, thereby defining a closed chamber for securing the bug inside the catch box. As used herein, "open" or cognate terms, refers to the trap being moved relative to the catch box in order to no longer cover over the opening in the catch box and no longer defining a closed chamber, thereby providing access through the opening to the inside the catch box. The trap can be moved or guide along two tracks, one on each side of the catch box in order to trap an unwanted bug, insect, spider, etc. inside the catch box.

After a bug is secured inside the catch box, the bug can be release by manipulating (e.g. pulling backward away from the catch box) the portion of the handle attached to the trap so that the trap no longer covered the opening in the catch box and the unwanted bug or spider can be released from the opening in the catch box and disposed of.

In certain embodiments of the apparatus, the handle is comprised of two flexible pieces, one hollow tube and one solid rod. The tube is attached to a back side of the catch box, and the solid rod passes through the hollow tube and is attached to the trap. The hollow tube is fixed in relation to the catch box while the solid rod can move relative to the catch box and travel back and forth axially inside the hollow tube to move the trap relative to the catch box to open and close the trap. The flexible handle, comprising the flexible hollow tube and flexible rod, has a wide range of motion making it easy to place the catch box flat against most flat and hard surfaces, such as walls or ceilings such that the opening can be properly positioned over the unwanted bug. Accordingly, the trap can work in all directions, including upside down and in tight spots.

In some embodiments, the bug catching apparatus comprises a catch box including an inside or interior region; an elongated handle, at least a portion of which is attached to the catch box, the elongated handle including a flexible tube member and a flexible rod member disposed within the flexible tube member; and a trap adapted to move within the interior region of the catch box; wherein the flexible tube member is attached to the catch box, and the flexible rod member is attached to the trap and used for imparting movement of the trap relative to the catch box. The flexible rod member is adapted to provide the back and forth movement of the trap within the interior region of the catch box to close off and open up the opening in the catch box. The catch box and the trap can be made of optically transparent material.

In accordance with additional aspects of the present disclosure, the bug catching apparatus further comprises one or more tracks on the catch box adapted to guide the back and forth movement of the trap within the interior region of the catch box. In this regard, one or more guide rails on the trap can be adapted to cooperate with the one or more tracks on the catch box.

Further aspects of the apparatus include the flexible rod member having a length greater than a length of the flexible tube member. In some embodiments, the length of the flexible rod member is from about 16 inches to about 20 inches and the length of the flexible tube member is less than the length of the flexible rod member and is from about 12 inches to about 16 inches.

Referring now to FIGS. 1-5, wherein illustrative aspects of an apparatus 100 for catching and releasing bugs are shown. The apparatus 100 generally includes a catch box 110, a handle 120, and a trap 140. During operation, the catch box 110 and trap 140 coordinate to catch and temporarility store an unwanted bug until it can be released and disposed of wherever the user desires. The handle 120 is adapted to place the catch box 110 in position over an unwanted bug. The handle 120 can be manipulated to activate the trap 140 by advancing the trap forward within the catch box 110, thereby closing the trap 140 and capturing and restraining the unwanted bug. The handle can then be manipulated to open the trap 140 so that the bug can be disposed of.

The catch box 110 is generally an opened-bottom box including an upper closed wall 112, a lower opening 114, and four sidewalls 116a, 116b, 116c, 116d extending downward from the upper closed wall to define an interior region 118. The interior region 118 is of a sufficient size to initially capture and restrain numerous bugs, whether small or large, therein. While the catch box 110 is illustrated as having an open cuboid shape, it is contemplated that the catch box may be of any other suitable shape and size such that the interior region 118 can restrain bugs of many different sizes. The closed upper wall 112 and sidewalls 116a, 116b, 116c, 116d of the catch box 110 can be formed from any suitable rigid material such as plastic or the like. In some embodiments, the catch box 110 can be formed from optically transparent (i.e. a clear) material which advantageously reduces the visibility of the catch box to bugs, thereby increasing their ease of capture, while simultaneously allowing a user to see the bug through the catch box to ensure that the bug has been trapped inside the catch box.

The handle 120 comprises an elongated flexible tube member 122 and an elongated flexible rod member 124 disposed within the tube member. The elongated flexible tube member 122 extends between a first distal portion 126 and a second distal portion 128. The first distal portion 126 is fixed to one of the sidewalls 116a, 116b, 116c, 116d of the catch box 110. As illustrated in FIG. 3, the first distal portion 126 of the flexible tube member 122 is fixed to sidewall 116b via an attachment means 130. The attachment means 130 can be any fastening hardware known to those having skill in the art, such as rivets, screws, nuts and bolts, glue, etc. The elongated flexible rod member 124 extends between a first distal end 132 and a second distal end 134 to define a length which is longer than a length of the flexible tube member 122. The first distal end 132 is generally adjacent the first distal portion 126 of the tube member 122 and is fixed to the trap 140. The second distal end 134 is generally adjacent the second distal portion 128 of the tube member 122. The second distal end 134 is axially pushed forward or backward along the length of the tube member 122 by a user of the apparatus 100, causing the rod member 124 to slide back and forth within the tube member 122, thereby causing the first distal end 132 to advance the trap 140 forward or backward, respectively, within the catch box 110. In other words, the elongated flexible tube member 122 is generally stationary with respect to the catch box 110, while the elongated flexible rod member 124 is movable with respect to the catch box 110. The handle 120 including the tube member 122 and rod member 124, can be formed from any suitable flexible material such as plastic or the like.

Figure 5:
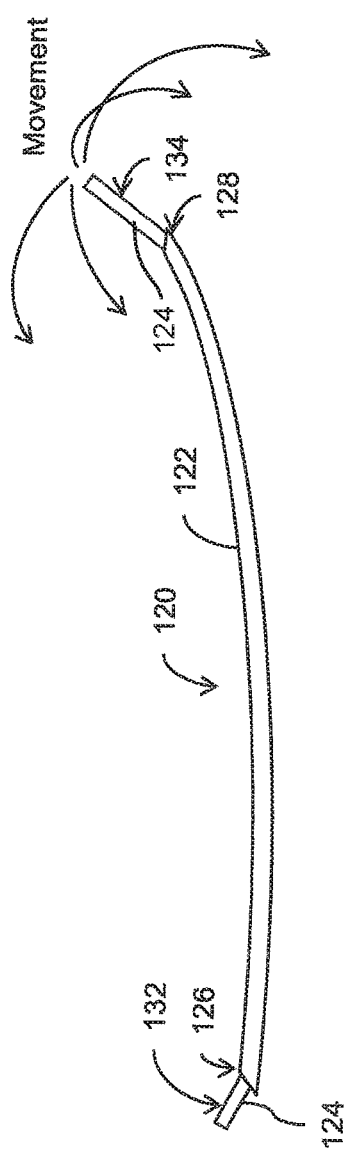
FIG. 5 is a side view showing aspects of a handle to be used in connection with a bug catching apparatus.

As illustrated in FIG. 5, the handle 120 is flexible, and may be bent from its original straight arrangement shown in FIG. 3. The flexible nature of the handle 120 advantageously permits a wide range of motion, making it easy to place the catch box 110 flat against most flat and hard surfaces such as walls, windows, and ceilings without necessarily requiring the handle 120 to also be flat against the same surface. The flexible handle 120 also advantageously permits the use of the bug catching apparatus 100 in difficult-to-access areas, such as under furniture, behind household fixtures such as toilets, or difficult-to-reach areas like high walls or high ceilings.

The handle 120 including the tube member 122 and rod member 124 can comprise any suitable length desired for use of the bug catching apparatus in the aforementioned wide range of motions and in difficult-to-access areas. The length of the rod member 124 is generally always longer than the length of the tube member 122. In some embodiments, the elongated flexible tube member 122 has a length of about 12 inches to about 16 inches or greater, and the elongated flexible rod member 124 has a length that is longer, and of about 16 inches to about 20 inches or greater. In some particular embodiments, the tube member 122 has a length of about 14 inches and the rod member 124 has a length of about 18 inches.

Details of the trap 140 are best shown with reference to FIGS. 3-4. In particular, the trap 140 generally comprises an C-shaped structure including a back wall 142 extending between an upper wall 144 and a lower wall 146, and an open front 147. The back wall 142, upper wall 144, and lower wall 146 define a C-shaped profile of the trap 140 having the open front 147. The back wall 142 includes a mounting hole 148 for attaching the first distal end 132 of the flexible rod 124 thereto. The flexible rod 124 can be attached to the trap 140 via attachment means 150. The attachment means 150 can be any fastening hardware known to those having skill in the art, such as rivets, screws, nuts and bolts, glue, etc.

The trap 140 is generally sized such that it can be received within the interior region 118 of the catch box 110 and can move forward and backward therein when the flexible rod 124 is respectively pushed forward or backward. In this regard, the trap 140 can slide on one or more tracks 152, 154 located on one or more of the sidewalls 116a, 116b, 116c, 116d of the catch box 110. The trap 140 also includes one or more guide rails 156, 158 which cooperate with the one or more tracks 152, 154 to permit and guide the forward and backward movement of the trap within the catch box 110.

The guide rails 156, 158 are illustrated in FIG. 4A and FIG. 4B as being located on the upper wall 144 of the trap 140, however it is contemplated that the guide rails could alternatively be located on the lower wall 146. In addition, a first set of guide rails 156, 158 could be located on the upper wall 144 and a second set of guide rails (not shown) could be located on the lower wall 146. The trap 140 can be formed from any suitable rigid material such as plastic or the like. Preferably, the trap 140 is formed from the same material as the catch box 110. Accordingly, the trap 140 can also be formed from an optically transparent material.

During use, the trap 140 is pushed forward by movement of the flexible rod member 124 until the open portion 147 of the C-shaped trap abuttingly engages sidewall 116*d*. Sidewall 116*d* and portions of sidewalls 116*a*, 116*c* of the catch box 110, along with the back wall 142, upper wall 144, and lower wall 146 of the trap 140 together define a closed chamber (not shown) within the interior region 118 of the catch box 110. The closed chamber temporarily traps or restrains the unwanted bug within the interior region 118 of the catch box 110, without causing harm to the bug. When it is desired to dispose of the unwanted bug, the flexible rod member 124 is pulled backward to open the trap 140, thereby causing the chamber to open such that the unwanted bug can be released via the lower opening 114 of the catch box 110.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A bug trap comprising:
a box including an upper wall and four side walls extending down from the upper wall, the upper wall and four side walls defining a lower opening providing access to an interior of the box,
a trap is disposed within the interior of the box and movable towards a front of the box and towards a back of the box, the trap includes a back wall, an upper wall, and a lower wall, and the upper wall and lower wall each extend from the back wall and towards the front of the box to thereby define an open front on the trap;
an elongated handle including a flexible tube attached to one of the four side walls at the back of the box, and a flexible rod disposed within the tube, attached to the back wall of the trap, and axially moveable within the tube towards the front of the box and towards the back of the box;
wherein:
when the rod is axially moved within the tube and towards the front of the box, the trap is moved towards the front of the box to thereby define a closed chamber for trapping a bug therein;
when the rod is moved axially within the tube and towards the back of the box, the trap is moved towards the back of the box so as not to define the closed chamber.

2. The bug trap according to claim 1, wherein the rod can be axially moved relative to the tube when the handle is in a bent position.

3. The bug trap according to claim 1, wherein the closed chamber is defined by the back wall of the trap, the upper wall of the trap, the lower wall of the trap, and the three other side walls of the four side walls of the box.

4. The bug trap according to claim 1, wherein the box includes one or more tracks that cooperate with the trap to guide the relative movement of the trap with respect to the box.

5. The bug trap according claim 4, wherein the trap further includes one or more guide rails that cooperate with the one or more tracks on the box to guide the relative movement of the trap with respect to the box.

6. The bug trap according claim 1, wherein the rod has a length greater than a length of the tube.

7. The bug trap according to claim 6, wherein the length of the rod is from 16 inches to 20 inches and the length of the tube is less than the length of the rod and is from 12 inches to 16 inches.

8. The bug catching apparatus of claim 1, wherein the box and the trap are made of an optically transparent material.

\* \* \* \* \*